(No Model.)

C. T. PRATT.
DRILL CHUCK.

No. 462,879. Patented Nov. 10, 1891.

Attest:
C. N. Benjamin
Byrd Ely

Inventor:
Charles T. Pratt
By D. Walter Brown
his atty

UNITED STATES PATENT OFFICE.

CHARLES T. PRATT, OF CLAYVILLE, NEW YORK, ASSIGNOR TO THE PRATT CHUCK COMPANY, OF SAME PLACE.

DRILL-CHUCK.

SPECIFICATION forming part of Letters Patent No. 462,879, dated November 10, 1891.

Application filed March 2, 1891. Serial No. 383,492. (No model.)

*To all whom it may concern:*

Be it known that I, CHARLES T. PRATT, a citizen of the United States, and a resident of Clayville, in the county of Oneida and State of New York, have invented certain new and useful Improvements in Drill-Chucks, of which the following is a specification.

My invention relates to improvements in drill-chucks, and more especially to improvements in that class of chucks which have a chamber or chambers in which the gripping-jaws work; and the object of my improvement is to provide means for strengthening the chuck and preventing the spreading of the walls of said chamber. In general the jaws of said chucks are operated by a screw which engages each jaw on only one side. Now I have found by practical experience that when the said jaws are forcibly closed upon the stock of a drill by means of said screw there is a tendency to tilt the jaws, which then act as wedges or levers to force apart the walls of the said chamber. As is well known, the pressure of the jaws on the drill-stock is very great. Consequently a powerful force is exerted in the aforesaid manner to spread apart the walls of the said chamber, which force in time spreads said walls so as to seriously damage the chuck. To overcome this difficulty I have devised means for strengthening the chucks against the aforesaid spreading action of the jaws, which means consist of devices that pass through the body of the chuck and across the said chamber, so as to tie the walls thereof together and prevent their spreading apart. The said devices also serve to limit the play of said jaws and prevent said jaws from being accidentally drawn out of the chuck.

Figure 1:
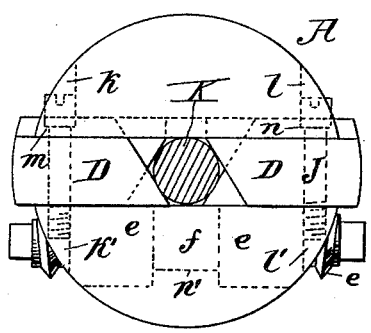
Figure 2:
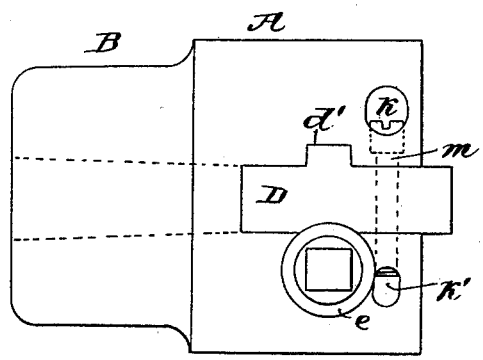
Figure 3:
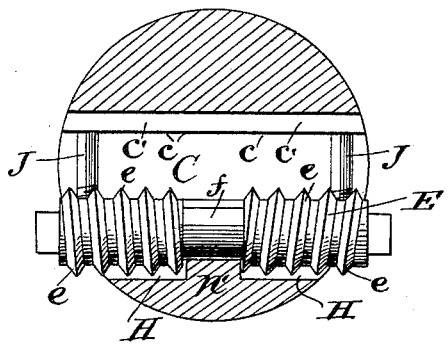
Figure 4:
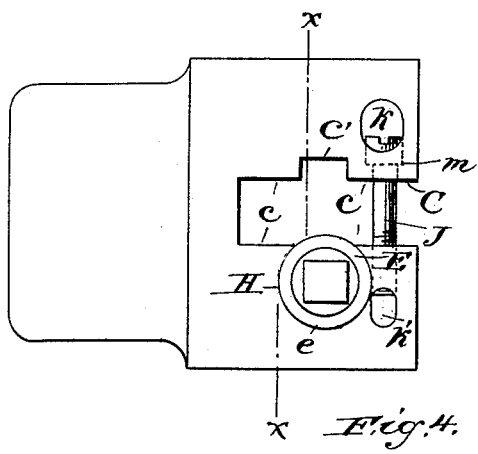
Figure 5:
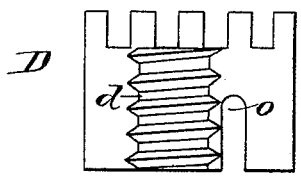

Referring to the drawings which accompany the specification to aid in the description, Figure 1 is an end view of the chuck. The jaws are shown in place and gripping the stock of a drill, and the strengthening devices are indicated by dotted lines. Fig. 2 is a longitudinal elevation of the chuck, showing the openings for the strengthening devices. Fig. 3 is a cross-section of the chuck on the line X X of Fig. 4, showing the chamber in the chuck and the strengthening devices, as also the main screw which operates the jaws. Said jaws are removed to enable the strengthening-screws to be clearly shown. Fig. 4 is a longitudinal elevation of the chuck with the jaws removed. Fig. 5 is a view of the under side of one jaw, showing the slot through which a strengthening device passes, and also the female threads which engage with the operating-screw.

A is a chuck, which is preferably formed of steel and in a cylindrical shape and with a rear part B of somewhat smaller diameter than the part A. Said part B is bored out for an arbor, (not shown in the drawings,) by which the chuck is fixed in a lathe. Entering from the front face of the chuck A is a deep chamber C, with parallel side walls $c\ c$. In this chamber C work jaws D D, and said jaws are operated by the engagement of their female threads $d\ d$ with the screw E. Said screw E passes through the chuck A by an opening H, which loosely fits said screw E. Said screw E is formed in the usual manner, with two sections $e\ e$, united by a spindle $f$, of smaller diameter than the sections $e\ e$, and said opening H has a central collar $n$, corresponding to the aforesaid spindle $f$, so that, although the screw E can turn freely in said opening H, it cannot move lengthwise therein. The aforesaid sections $e\ e$ of the screw E have the one right-handed and the other left-handed threads of equal pitch, the said threads engaging the corresponding female threads $d\ d$ in the jaws D D. Thus by turning the screw E in one direction or the other the jaws D D may be made to approach to or recede from each other, and said jaws D D each have a rib $d'$, which engages with a recess $c'$ in one of the walls $c$ of the chamber C for the purpose of guiding said jaws. Now said screw E engages with each of the jaws D D on only one side, and there is a tendency to tilt the jaws D D when they are closed upon a drill-stock, as in Fig. 1, and to thereby force the walls $c\ c$ apart. To remedy this I pass screws J J, usually two in number, through holes $k\ k'$ and $l\ l'$ in the chuck A and across the chamber C. The ends of each of said screws J J are threaded to engage with corresponding threads in the holes $k'\ l'$, and the holes $k\ l$ are somewhat enlarged near their outer ends to receive the heads of the screws J J and form shoulders $m$ $n$, against which said heads of the screws J J come. Now said screws J J being inserted in their several openings $k$ $k'$ and $l$ $l'$ and tightened, it is evident they will serve as ties across the chamber C and will hold the walls $c$ $c$ against spreading apart. Of course in place of screws any equivalent device could be used. The said jaws D D have slots $o$ entering from the outer face of said jaws and of a size to easily fit over said screws J J. The said jaws D D are first inserted into the chamber C and drawn together by the screw E, then the screws J J are passed through the aforesaid holes $k$ $k'$ and $l$ $l'$, and through the aforesaid slots $o$ in the jaws D D. The said screws J J are then tightened and the chuck is ready for use. It will be evident from Fig. 5 that the length of the slots $o'$ limits the amount of movement of the jaws D D, and that the screws J J will prevent the said jaws D D from being accidentally drawn out of the chuck A.

Should the chuck A or jaws D D wear by reason of long usage, so that said jaws do not fit properly in the chamber C, then by tightening the said screws J J the walls $c$ $c$ of the chamber C may be drawn nearer together, so that the jaws D D will again fit properly in the chamber C.

It is evident that my invention is not restricted to chucks with only two jaws of the kind shown in the drawings, but is equally applicable to all chucks which have chambers in which any number of jaws work. For my invention, broadly considered, is the use of strengthening devices in chucks, which devices pass from wall to wall of the chambers in which the jaws work, so as to hold said walls against spreading.

Now, having described my invention, I claim—

1. In a chuck having a chamber for the jaws which grip a drill, a device which passes across the said chamber and engages with both walls of said chamber in order to prevent the spreading of the said walls, as described.

2. In a chuck having a chamber for the jaws which grip a drill, devices which pass across said chamber and engage both walls of said chamber in order to prevent the spreading of the said walls, as described.

3. The combination of a drill-chuck having a chamber for the jaws which grip a drill, screws crossing said chamber and engaging with opposite walls of said chamber, and jaws working in said chamber and slotted for the passage of said screws, as described.

Signed at Clayville, in the county of Oneida and State of New York, this 14th day of February, A. D. 1891.

CHARLES T. PRATT.

Witnesses:
C. HUMPHREY,
JOHN DEMPSEY.